(12) United States Patent
Ardo et al.

(10) Patent No.: US 10,142,664 B2
(45) Date of Patent: Nov. 27, 2018

(54) METHOD AND DEVICE FOR DETERMINING PROPERTIES OF A GRAPHICAL OVERLAY FOR A VIDEO STREAM

(71) Applicant: Axis AB, Lund (SE)

(72) Inventors: Bjorn Ardo, Lund (SE); Song Yuan, Sodra Sandby (SE)

(73) Assignee: Axis AB, Lund (SE)

( * ) Notice: Subject to any disclaimer, the term of this patent is extended or adjusted under 35 U.S.C. 154(b) by 101 days.

(21) Appl. No.: 14/958,304

(22) Filed: Dec. 3, 2015

(65) Prior Publication Data

US 2016/0165271 A1    Jun. 9, 2016

(30) Foreign Application Priority Data

Dec. 4, 2014    (EP) ..................................... 14196225

(51) Int. Cl.
*G06K 9/46*    (2006.01)
*G06T 7/20*    (2017.01)
(Continued)

(52) U.S. Cl.
CPC ..... *H04N 21/23424* (2013.01); *G06K 9/4652* (2013.01); *G06K 9/4661* (2013.01);
(Continued)

(58) Field of Classification Search
CPC ......... H04N 21/23424; H04N 21/2402; H04N 21/6125; H04N 21/23418; H04N 21/242;
(Continued)

(56) References Cited

U.S. PATENT DOCUMENTS 8,483,389 B1    7/2013  Masterson et al.
9,161,030 B1 *  10/2015  Masterson ......... H04N 5/44504
(Continued)

FOREIGN PATENT DOCUMENTS

CN    1672166 A    9/2005
CN    1745373 A    3/2006
(Continued)

OTHER PUBLICATIONS

EP 14 19 6225.8 European Search Report (dated May 12, 2015).
CN 201510881547.1 Office Action dated Jan. 24, 2018.

*Primary Examiner* — Benjamin R Bruckart
*Assistant Examiner* — Akshay Doshi
(74) *Attorney, Agent, or Firm* — Volpe and Koenig, P.C.

(57) ABSTRACT

The present invention relates generally to video communication systems, and more specifically to a method and device for adjusting properties of a graphical overlay for a video stream, the adjusted properties being at least one of a position, a degree of animation and a color composition of the graphical overlay and the adjustment is based on a scene depicted by the time period of the video stream. The adjustment is performed if an estimated bitrate for transmitting an encoded bitstream comprising the time period of the video stream and the graphical overlay exceeds a predetermined upper threshold bitrate for transmitting an encoded single bitstream comprising the time period of the video stream and the graphical overlay.

14 Claims, 6 Drawing Sheets

(51) Int. Cl.
*G06T 7/73* (2017.01)
*G06T 7/90* (2017.01)
*H04N 21/234* (2011.01)
*H04N 21/431* (2011.01)
*H04N 21/24* (2011.01)
*G06K 9/62* (2006.01)
*H04N 21/61* (2011.01)
*H04N 21/242* (2011.01)

(52) U.S. Cl.
CPC .............. *G06K 9/6215* (2013.01); *G06T 7/20* (2013.01); *G06T 7/73* (2017.01); *G06T 7/90* (2017.01); *H04N 21/23418* (2013.01); *H04N 21/2402* (2013.01); *H04N 21/242* (2013.01); *H04N 21/4312* (2013.01); *H04N 21/6125* (2013.01)

(58) Field of Classification Search
CPC .... G06T 7/73; G06T 7/90; G06T 7/20; G06K 9/6215; G06K 9/4661; G06K 9/4652
See application file for complete search history.

(56) References Cited

U.S. PATENT DOCUMENTS

| | | |
|---|---|---|
| 2005/0024384 A1 | 2/2005 | Evans et al. |
| 2007/0286278 A1 | 12/2007 | Govindaswamy et al. |
| 2008/0204471 A1* | 8/2008 | Jaeger .................... G09G 5/02 345/594 |
| 2009/0219440 A1* | 9/2009 | Maertens ............. G11B 27/034 348/468 |
| 2009/0219994 A1* | 9/2009 | Tu ........................ H04N 19/186 375/240.08 |
| 2009/0262195 A1 | 10/2009 | Yoshida et al. |
| 2010/0091181 A1 | 4/2010 | Capps |
| 2010/0312608 A1* | 12/2010 | Shan ................. G06F 17/30867 705/14.54 |
| 2012/0019722 A1* | 1/2012 | Kwisthout ............. H04N 5/445 348/564 |
| 2012/0170643 A1* | 7/2012 | Soroushian .......... G11B 27/005 375/240.01 |
| 2013/0188015 A1* | 7/2013 | Tsukagoshi .......... H04N 19/597 348/43 |
| 2014/0005809 A1* | 1/2014 | Frei ..................... H04L 29/1249 700/90 |
| 2014/0118545 A1 | 5/2014 | Iwasaki |
| 2014/0359656 A1* | 12/2014 | Banica ................ H04N 21/812 725/32 |
| 2015/0054835 A1* | 2/2015 | Mahajan ................ G09G 5/006 345/473 |
| 2016/0142746 A1* | 5/2016 | Schuberth .......... H04N 21/2387 725/31 |

FOREIGN PATENT DOCUMENTS

| | | |
|---|---|---|
| EP | 0805600 A2 | 11/1997 |
| EP | 2230839 A1 | 9/2010 |
| JP | 2008259073 A2 | 10/2008 |
| WO | 2002049351 A2 | 6/2002 |

* cited by examiner

METHOD AND DEVICE FOR DETERMINING PROPERTIES OF A GRAPHICAL OVERLAY FOR A VIDEO STREAM

FIELD OF INVENTION

The present invention relates generally to video communication systems, and more specifically to a method and device for determining properties of a graphical overlay for a video stream.

BACKGROUND

Presentation of video content is becoming increasingly varied. For example, a primary video content (such as a film or other motion video clip) may include an overlay with additional video graphics or objects such as e.g. user interface graphics, subtitles, logo etc. Moreover, with today's increasingly widespread services for streaming of video content, it is often important to reduce the bitrate of the encoded video content, such as when streaming to a mobile phone.

However, in such low bitrate applications, where the video content may be highly compressed for reducing the bitrate, the contribution to the bitrate of the graphical overlay, for example a logo, may be substantial.

EP 2 230 839 A1 (Koninklijke Philips Electronics N.V.) describes a system for overlaying a primary video content with other motion video content such as e.g. a secondary video program. The document describes how the size of the overlaid secondary video program may change depending on the size of the display that shows the primary and secondary video program which allegedly may reduce the bitrate. The content of the first video stream is not taken into consideration.

It is desirable that a more flexible display approach can be provided in order to further reduce the bitrate for a video stream comprising a graphical overlay.

SUMMARY

In view of the above, an objective of the invention is to solve or at least reduce one or several of the drawbacks discussed above. Generally, the above objective is achieved by the attached independent patent claims.

According to a first aspect, the present invention is realized by a method for inserting a graphical overlay on a video stream during a time period of the video stream, comprising the steps of: providing an upper threshold bitrate for transmitting an encoded single bitstream comprising the time period of the video stream and the graphical overlay, calculating an estimated bitrate for transmitting an encoded bitstream comprising the time period of the video stream and the graphical overlay, determining if the estimated bitrate exceeds the upper threshold value.

If the estimated bitrate exceeds the upper threshold value, the method comprises adjusting at least one of a position, a degree of animation and a color composition of the graphical overlay based on a scene depicted by the time period of the video stream, such that a bitrate for transmitting an encoded bitstream comprising the time period of the video stream and the graphical overlay at the adjusted position, having the adjusted degree of animation and/or having the adjusted color composition, falls below the upper threshold value.

The method further comprises inserting the graphical overlay on the video stream during the time period of the video stream.

By the term "a time period of a video stream" should, in the context of present specification, be understood at least one video frame of the video stream.

The estimation of the bitrate may be done using any suitable method. The bitrate depends on e.g. any motion present in the time period of the video stream, the group of pictures (GOP) structure, GOP limit and compression method. Furthermore, a contrast value of the content of a video frame and a contrast value between subsequent video frames may also be important when estimating the bitrate of the time period of the video stream. Moreover, a bitrate that was required for transmitting a previous time period of the video stream, including or not including a graphical overlay, may also be used for the estimation.

By the term "contrast value" should, in the context of the present specification, be understood the difference in the color and brightness of an image, within an area of the image, within an object of the image, or such difference between two areas/objects in the image.

By the term "color composition" of an object/area/graphical overlay should, in the context of the present specification, be understood the colors and brightness of the object/area/graphical overlay. Moreover, the term may encompass the distribution of the colors in the object/area/graphical overlay.

The estimated bitrate may for example exceed the upper threshold value due to an increased degree of motion in the video stream, or an increased contrast value of the content of a video frame in the video stream or an increased contrast value between subsequent video frames in the video stream.

The present invention is based upon the realization that by adjusting at least one of a position, a degree of animation and a color composition of the graphical overlay (also referred to as properties of the graphical overlay in this specification) based on the scene depicted by the time period of the video stream (i.e. the image content of the frames in the time period of the video stream), the final bitrate for the time period of the video stream including the adjusted graphical overlay can advantageously be controlled to meet an upper threshold bitrate.

Typically, a graphical overlay has a pre-configured size, position and color, which are fixed. When determining these properties, the underlying video, onto which the graphical overlay will be inserted, is generally not taken into consideration. This means that in a low bitrate video stream, the contribution to a final bitrate, i.e. the bitrate of the ultimately transmitted bitstream comprising both the video stream and the graphical overlay, from a graphical overlay (e.g. a logo) placed in a low contrast portion of the video stream such that the contrast between the graphical overlay and low contrast portion of the video stream is big, may be substantial.

Consequently, placing the graphical overlay such that this contrast is lowered, or changing the color composition of the graphical overlay to more closely match the color composition of the area on to which it is placed, may reduce the final bitrate substantially.

Moreover, an animated overlay e.g. a rotating logo may contribute substantially to the final bitrate in the low bitrate video stream. Consequently, a reduced animation may reduce the final bitrate substantially.

By providing a method that is performed on a time period of the video stream, a more flexible way of adjusting the properties of the graphical overlay, i.e. at least one of a position, a degree of animation and a color composition of the graphical overlay, is achieved. The properties may thus be independently adjusted for each time period of the video stream. In other words, the properties of the graphical overlay may be adjusted for a time period of the video stream, for example 1/30 second (one frame), 1 second, 10 seconds, 1 minute etc. When the properties are adjusted, it may not yet be known for how long time period these properties will apply. The length of the time period may be based on e.g. properties of the video stream, or a threshold number of frames.

In summary, the present method comprises these main steps:
1. Checking if an adjustment of the graphical overlay may be needed by estimating the bitrate that will be required for transmitting the present time period of the video stream and the graphical overlay with its current properties.
2. If the estimated bitrate is too high.
   a. adjust some or all properties of the graphical overlay based on the content of the video stream in order to decrease the required bitrate
3. Insert the graphical overlay, with its adjusted or not adjusted properties, on the video stream during the time period of the video stream.

According to some embodiments, the method further comprises the step of: determining a start frame of the time period of the video stream by at least one of:
calculating a number of frames since a start frame of a preceding time period of the video stream for which an estimated bitrate for transmitting an encoded bitstream comprising the time period of the video stream and the graphical overlay was calculated and determining if the calculated number of frames is larger than a threshold value,
receiving a pan, tilt and/or zoom signal from a PTZ video camera acquiring the video stream,
determining a degree of difference between a current frame and a frame of a preceding time period of the video stream for which an estimated bitrate for transmitting an encoded bitstream comprising the time period of the video stream and the graphical overlay was calculated by performing a block-matching operation between the current frame and the frame of the preceding time period, and determining if the degree of difference is larger than a threshold value.

By only adjusting of the properties of the graphical overlay after at least one of the above conditions have been met, and if the estimated bitrate exceeds the upper threshold bitrate, the graphical overlay may adjust its properties at advantageous moments. For example, when a PZT signal is received, the depicted scene in the video stream is probably changed and an adjustment of the properties of the graphical overlay may be needed. Moreover, any adjustment of the properties of the graphical overlay may be less noticeable for a viewer since the depicted scene in the video stream has probably changed.

Moreover, by not checking if an adjustment of the properties of the graphical overlay should be made until the scene depicted at a current frame in the video stream is noticeably different from the scene depicted in the preceding time period of the last check, unnecessary estimations of the bitrate can be avoided. Consequently a reduced computational complexity can be achieved.

Furthermore, by not checking if an adjustment of the properties of the graphical overlay should be made until a certain number of frames has passed since the last check, unnecessary estimations of the bitrate can be avoided. Consequently a reduced computational complexity can be achieved.

It should be noted that according to some embodiments, more than one of the above discussed conditions may have to be met before a new time period of the video stream, for which the properties of the graphical overlay may change, is defined (i.e. by setting the start frame of the time period).

According to some embodiments, the method further comprises the step of encoding the time period of the video stream using one or more group of pictures, GOP, structures, each GOP structure comprising an intra frame followed by a plurality of inter frames, wherein the start frame of the time period of the video stream coincides with the intra frame of a first GOP structure out of the one or more GOP structures.

This is advantageous since the actual changing of the properties of the graphical overlay then takes place in a frame of the video stream that will be coded using an intra frame (I-frame). Since an I-frame is encoded as a fully specified picture, like a conventional static image file, a large change in the frame compared to a previous frame in the video stream do not influence the encoded size of the frame. Consequently, a change of the properties of the graphical overlay, such a new position of the graphical overlay, or a new color composition of the overlay, may not negatively influence the actual bitrate if this change takes place on an I-frame.

According to some embodiments, the step of calculating an estimated bitrate is performed using at least one of: a required bitrate for transmitting an encoded bitstream comprising a preceding time period of the video stream, a subset of data of the time period of the video stream, and a subset of data of a preceding time period of the video stream.

By the term "subset of data" should, in the context of present specification, be understood that according to some embodiment, only a sub-set of the frames comprised in the corresponding time period is used for the calculation, and/or that only a part of each frame used for the calculation is used when estimating the bitrate. This may reduce the computational complexity of the estimation, and further also reduce the time required for the estimation.

It should be noted that the step of calculating an estimated bitrate may be performed using the required bitrate for transmitting an encoded bitstream comprising a preceding time period of the video stream including the graphical overlay. In this embodiment, e.g. the average bitrate of the last second of video including the graphical overlay may be used for estimating the bitrate of the current time period. This may be advantageous since it then may be known if the properties of the graphical overlay for the preceding time period caused the bitrate to be below the upper threshold bitrate or not. If the bitrate was below the upper threshold bitrate, no further changes of the properties of the graphical overlay may be needed.

According to some embodiments, the adjusted position for the overlay is one of a plurality of predetermined positions.

For example, in case the graphical overlay comprises a logo, the company owning the logo may require that the logo is included in one of a set of predetermined positions e.g. the top left or the top right corner. Moreover, it may according to some embodiments be disadvantageous if the graphical overlay covers interesting parts of the frames of the video stream, e.g. the center part of each frame.

According to some embodiments, the step of adjusting the properties of the graphical overlay comprises the steps of: determining a contrast value for each of a plurality of areas in the scene depicted by the time period of the video stream, adjusting the position of the graphical overlay based on the determined contrast values.

According to this embodiment the position of the graphical overlay can be adjusted such that the contrast between the graphical overlay and the area of the scene corresponding to the adjusted position of the graphical overlay is decreased compared to the contrast between the graphical overlay and the area of the scene corresponding to the current (non-)adjusted position of the graphical overlay.

By the term "contrast between the graphical overlay and the area of the scene corresponding to the position of the graphical overlay" should, in the context of present specification be understood contrast value of the interface (i.e. threshold regions) between the graphical overlay and the area onto which the graphical overlay is positioned.

Moreover, according to the present embodiment, the graphical overlay can be placed such that it covers areas in the video stream with a high contrast value. In this case, the required (final) bitrate for transmitting the time period of the video stream including the graphical overlay may also be decreased compared to the estimated bitrate.

Furthermore, according to some embodiment, if the contrast value corresponding to the determined position of the graphical overlay is below a threshold value, the step of adjusting further comprises the steps of: determining an area color composition of the area corresponding to the determined position of the graphical overlay, and adjusting the color composition of the graphical overlay based on the determined color composition of the area such that a contrast value between the graphical overlay and the area is reduced.

This means that the graphical overlay can be placed in an area with low contrast, for example depicting a blue sky, and by also changing the color composition of the graphical overlay to be similar to the color composition of the area with the low contrast, the contrast value of the interface between the graphical overlay and the scene depicted by video stream may be kept low and consequently also the bitrate for encoding the video stream including the graphical overlay.

According to some embodiments, the step of adjusting comprises the steps of: determining a color composition for each of a plurality of areas in the scene depicted by the time period of the video stream, and adjusting the position of the graphical overlay by comparing the determined color compositions and the color composition of the graphical overlay.

An advantage of this is that without changing the color composition of the graphical overlay, the contrast of the interface between the graphical overlay and the scene depicted by video stream may be kept low and consequently also the bitrate for encoding the video stream including the graphical overlay. In other words, the graphical overlay is placed in a region with a similar color composition compared to the color composition of the graphical overlay which thereby reduces the contrast between the area of the scene where the graphical overlay is placed and the graphical overlay.

According to some embodiments, the step of determining the position of the graphical overlay is associated with receiving a pan, tilt and/or zoom signal from a PTZ video camera acquiring the video stream.

A change of the position of the graphical overlay may be very noticeable for a viewer. By only adjusting the position of the graphical overlay when the scene depicted by the video stream changes substantially, e.g. after a PTZ signal from the camera, such a change of the position of the graphical overlay may be perceived as less noticeable by the viewer.

According to some embodiments, the step of adjusting comprises the steps of: estimating a degree of motion for the time period of the video stream, and adjusting the degree of animation of the graphical overlay for the time period of the video stream by reducing the degree of animation by a value, wherein the value is based on the estimated degree of motion.

The degree of motion may be estimated by any suitable video motion detection (VMD) algorithm. VMD is a way of defining activity in a scene by analyzing image data and differences in a series of images. In its simplest form, the VMD may be performed by comparing the values of the pixel in one image with the values of the corresponding pixels in a preceding image and count the number of pixels that have changed between the two images. The estimation of the degree of movement may according to some embodiments be performed by analyzing a preceding time period of the video stream (e.g. the last second) and assume that the degree of movement for the current time period of the video stream is the same.

The increase in the bitrate due to the movement of the scene depicted by the video stream may be neutralized by reducing the degree of animation of the graphical overlay. For example, by changing the degree of animation such that the graphical overlay is only animated (i.e. moved/rotated/trans-formed) in a frame of the video stream that will be coded using an intra frame (I-frame) as described above, the required bitrate may be reduced. Moreover, by reducing the degree of animation based on the estimated degree of motion, the animation of the graphical overlay may only be reduced to the extent needed in order to meet the upper threshold bitrate.

According to some embodiments, the step of adjusting comprises the steps of: determining a color composition of an area corresponding to a present position of the graphical overlay, and adjusting the color composition of the graphical overlay based on the determined color composition such that a contrast value between the graphical overlay and the area is reduced.

A change of the position of the graphical overlay may be very noticeable for a viewer and by not moving the graphical overlay but instead only adjusting the color composition to match the background of the graphical overlay at its current position, the adjustment of the properties of the graphical overlay in order to meet the upper threshold bitrate may be perceived as less noticeable by the viewer.

According to some embodiments, the method further comprises the steps of: encoding the time period of the video stream and the graphical overlay into a single encoded bitstream, and transmitting the single encoded bitstream. By encoding the video stream and the graphical overlay as a single bitstream, a reduced bitrate for transmitting the video stream and the graphical overlay may be accomplished.

In a second aspect, the present invention provides a computer program product comprising a computer-readable storage medium with instructions adapted to carry out the method according to the first aspect when executed by a device having processing capability.

In a third aspect, the present invention provides a video stream processing device comprising: a memory configured to store an upper threshold bitrate for transmitting an encoded single bitstream comprising a time period of a video stream and a graphical overlay, a bitrate estimating module configured to calculate an estimated bitrate for transmitting an encoded bitstream comprising the time period of the video stream and the graphical overlay, a graphical overlay handling module configured to determine if the estimated bitrate exceeds the upper threshold value, and if the estimated bitrate exceeds the upper threshold value, to adjust at least one of a position, a degree of animation and a color composition of the graphical overlay based on a scene depicted by the time period of the video stream such that a bitrate for transmitting an encoded bitstream comprising the time period of the video stream and the graphical overlay at the adjusted position, having the adjusted degree of animation and/or having the adjusted color composition falls below the upper threshold value. The video stream processing device further comprises a graphical overlay inserting module configured to insert the graphical overlay on the video stream during the time period of the video stream.

The video processing device may advantageously be a part of a digital video camera, wherein the time period of the video stream is acquired by the digital video camera. This reduces the need of further electronic devices connected to the video camera and is e.g. advantageous for assembling reasons and for reducing the required space for mounting the video processing device and the camera.

It should be noted that the video stream processing device may be configured for performing any of the embodiments of the first aspect described above.

In a fourth aspect, the present invention provides a system comprising: a video stream processing device comprising: a memory configure to store an upper threshold bitrate for transmitting an encoded single bitstream comprising a time period of a video stream and a graphical overlay, a bitrate estimating module configured to calculate an estimated bitrate for transmitting an encoded bitstream comprising the time period of the video stream and the graphical overlay, a graphical overlay handling module configured to determine if the estimated bitrate exceeds the upper threshold value, and if the estimated bitrate exceeds the upper threshold value, to adjust at least one of a position, a degree of animation and a color composition of the graphical overlay based on a scene depicted by the time period of the video stream, such that a bitrate for transmitting an encoded bitstream comprising the time period of the video stream and the graphical overlay at the adjusted position, having the adjusted degree of animation and/or having the adjusted color composition, falls below the upper threshold value. The video stream processing device further comprises a graphical overlay inserting module configured to insert the graphical overlay on the video stream during the time period of the video stream.

The system further comprises an encoder configured to encode the time period of the video stream and the graphical overlay into a single encoded bitstream, a first digital network module configured to transmit the single encoded bitstream via digital network, a second digital network module configured to receive the single encoded bitstream via the digital network, a decoder configured to decode the single encoded bitstream into a time period of a video stream comprising the graphical overlay. The system further comprises a client comprising: a display configured to display the time period of the video stream comprising the graphical overlay.

The second, third and fourth aspects may generally have the same features and advantages as the first aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF THE PREFERRED EMBODIMENTS

FIGS. 1-6 show different possibilities of inserting a graphical overlay 102, at a determined position, having a determined degree of animation and/or having a determined color composition, on a time period of a video stream. Each FIG. 1-6 shows a snapshot of such a time period of a video stream, along with determined properties of the graphical overlay 102.

Figure 1:
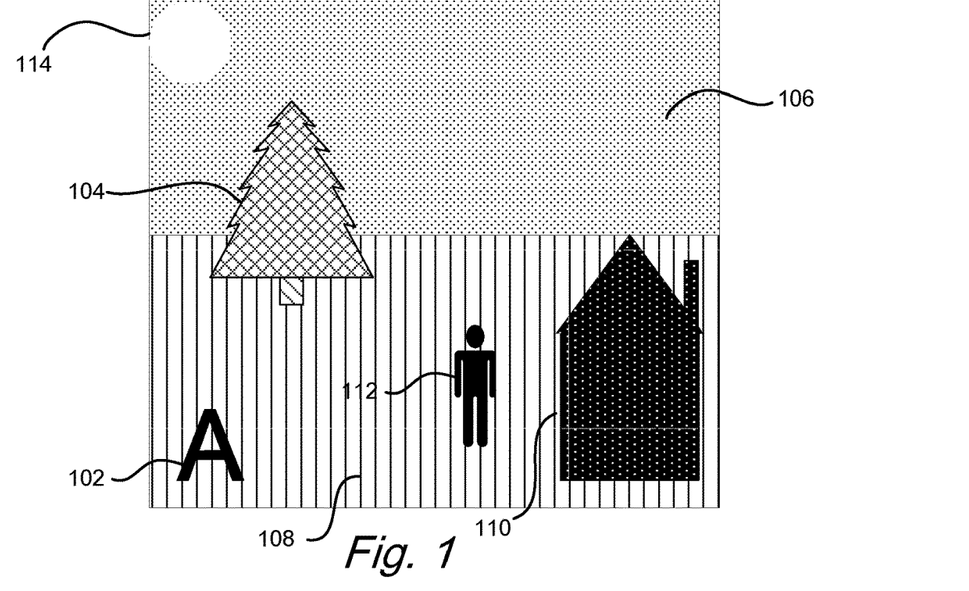
FIG. 1 shows by way of example a scene from a video stream onto which a graphical overlay is inserted.

FIG. 1 shows a typical scene which is depicted in a video stream acquired by a camera, for example a monitoring camera. The scene comprises areas with different color compositions, for example, the color composition of the sky 106 differs from the color composition of the ground 108. Moreover, the scene comprises an object 112 of interest, e.g. a person 112. Furthermore, the scene comprises a high contrast object 104, for example a tree comprising leafs of different colors, limbs, boughs and see through areas. Onto this scene, a graphical overlay 102 is placed. The graphical overlay is in this case a logotype but other types of graphical overlays, such as a representation of a clock, or a wind indicator, are equally possible. In the case shown in FIG. 1, the contrast between the graphical overlay 102 and the area 108 onto which it is placed is large. This means that the resulting encoded bitstream, including both the video stream depicting the scene of FIG. 1 and the graphical overlay, will require a larger bitrate compared to an encoded bitstream only including the video stream, or compared to an encoded bitstream where the properties of the graphical overlay is adjusted such that the contrast between the scene and the graphical overlay is reduced.

Figure 2:
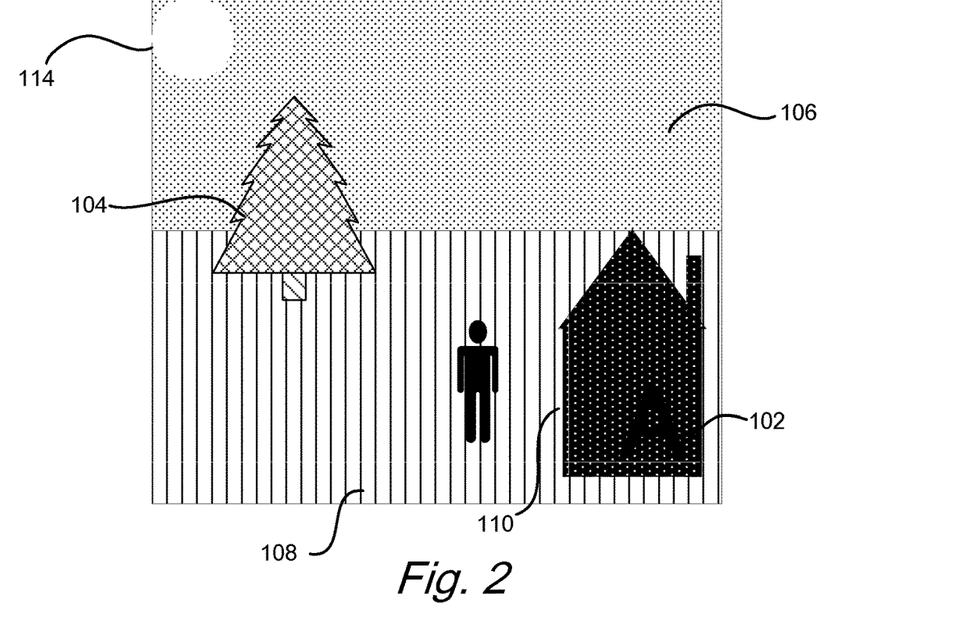
FIG. 2 shows the scene of FIG. 1, wherein the graphical overlay has been moved to reduce the contrast between the graphical overlay and the scene of the video stream.

In FIG. 2, the position of graphical overlay 102 has been adjusted in order to reduce the contrast between the graphical overlay 102 and the area 110 onto which it the graphical overlay 102 is placed. In the scenario of FIG. 2, the color composition of the graphical overlay 102 has been kept. In order to adjust the position of the graphical overlay 102, a contrast value for each of a plurality of areas 104, 106, 108, 110, 114, in the scene have been determined and the position of the graphical overlay 102 has been adjusted based on these contrast values. Furthermore, the color composition of the plurality of areas has also been determined, and the graphical overlay 102 has been positioned in the low contrast area 110 with a similar color composition as the color composition of the graphical overlay 102. Consequently, the bitrate for transmitting an encoded bitstream comprising the scenario shown in FIG. 2 will be lower compared to transmitting an encoded bitstream comprising the scenario shown in FIG. 1.

Figure 3:
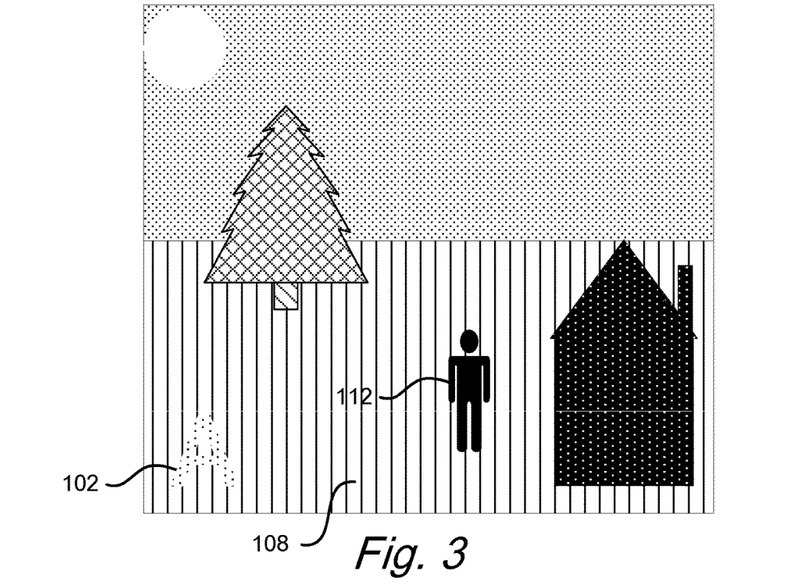
FIG. 3 shows the scene of FIG. 1, wherein the color composition of the graphical overlay has been changed in order to reduce the contrast between the graphical overlay and the scene of the video stream.

In FIG. 3, the graphical overlay 102 is positioned at the same position as in FIG. 1. This may be a good position for the graphical overlay since the contrast value of the area 108 near the position of the graphical overlay 102 in FIG. 3 is determined to be low. The area color composition of the area 108 near and behind the graphical overlay 102 is determined, i.e. the area corresponding to the position of the graphical overlay 102. Finally, for lowering the required bitrate, the color composition of the graphical overlay 102 is adjusted to resemble a color composition of the area 108 onto which the graphical overlay 102 is placed. Since the contrast value of the area 108 is determined to be low as discussed above, such a change of color composition of the graphical overlay may result in a low contrast between the graphical overlay 102 and the area 108 and consequently to a reduced final bitrate. An advantage of not moving the graphical overlay 102 but instead adjusting the color composition of the graphical overlay 102 is that this type of change of the properties of the graphical overlay 102 may be perceived as less noticeable for a viewer.

Figure 4:
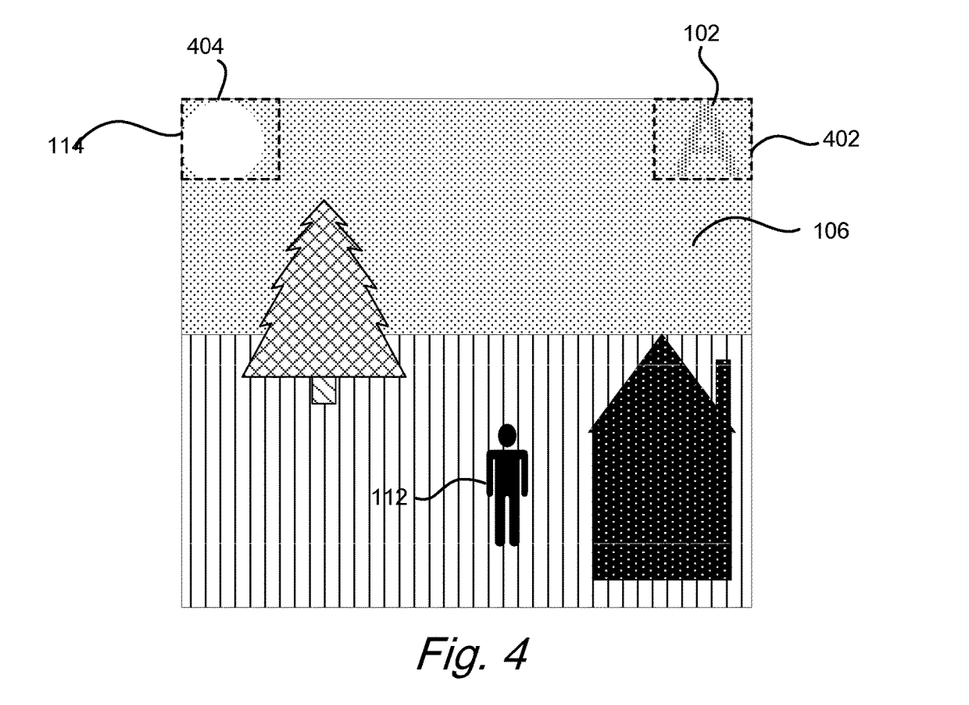
FIG. 4 shows the scene of FIG. 1, wherein the graphical overlay has been moved to one of two predetermined positions and where the color composition of the graphical overlay has been changed in order to reduce the contrast between the graphical overlay and the scene of the video stream.

According to some embodiments, the graphical overlay should only be positioned at one of a plurality of predetermined positions. This is shown in FIG. 4, wherein the adjusted position for the graphical overlay 102 is one of a plurality of predetermined positions 402, 404. It may be disadvantageous if the graphical overlay 102 is placed on an area of interest for a viewer, e.g. on a person 112. For example, each of the plurality of predetermined positions 402, 404 may be located in a corner of the scene depicted by the video stream. According to other embodiments, each of the plurality of predetermined positions may be located along the edges of the scene depicted by the video stream. Moreover, the predetermined positions may vary during the capture of the scene by a camera. For example, if an object of interest 112 is moving towards one of the predetermined positions, this predetermined position may be removed from the possible choices of positions for the graphical overlay for a certain period of time e.g. while the object of interest 112 is near said predetermined position.

According to some embodiments, each of the predetermined positions 402, 404 corresponds to placing the graphical overlay 102 within a macroblock, or within a plurality of macroblocks when encoding the video stream and the graphical overlay 102 into a single encoded bitstream. This may be advantageous since the bitrate may be lowered. Moreover, by placing the graphical overlay within a macroblock or a plurality of macroblocks, it may be easier to set an advantageous Quantization Parameter (QP) value, such that a higher quality of the encoded video is achieved without increasing the required bit rate. A lower QP will result in better video quality but require a higher bit rate. A higher QP will result in lower video quality, more compression and a lower bit rate.

In FIG. 4, two predetermined positions 402, 404 exist. Since it is determined that the predetermined position 402 in the top right corner of the scene has a lower contrast value compared to the predetermined position 404 in the top left corner of the scene, the top right position 402 is advantageous as discussed above. Moreover, since an area color composition of the area corresponding to the determined position 402 is determined to differ from the original color composition of the graphical overlay 102 (as shown in FIG. 1), the color composition of the graphical overlay 102 is adjusted based on the determined area color composition, as discussed in conjunction with FIG. 3.

Figure 5:
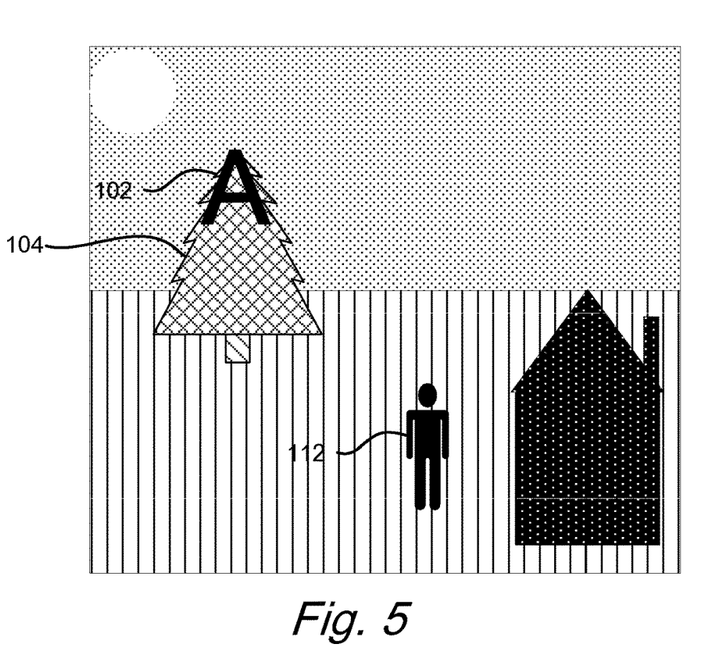
FIG. 5 shows the scene of FIG. 1, wherein the graphical overlay has been moved to cover a high contrast part of the scene of the video stream.

In some scenes there exist areas with a high contrast value which may not be an area of interest for a viewer. In FIG. 5, such an area is represented by the top of a tree 104. This area has been determined by determining a contrast value for each of a plurality of areas in a scene depicted by the time period of the video stream and possibly comparing these areas with areas of interest 112 and/or any predetermined positions such as the ones discussed in conjunction with FIG. 4. Such an uninteresting area which has a high contrast value may contribute to the bitrate to an unnecessary high extent. By placing the graphical overlay 102 on the top of the tree 104, this high contrast area may not need to be encoded since it is covered by the graphical overlay 102. Consequently, the final bitrate can be reduced.

Figure 6:
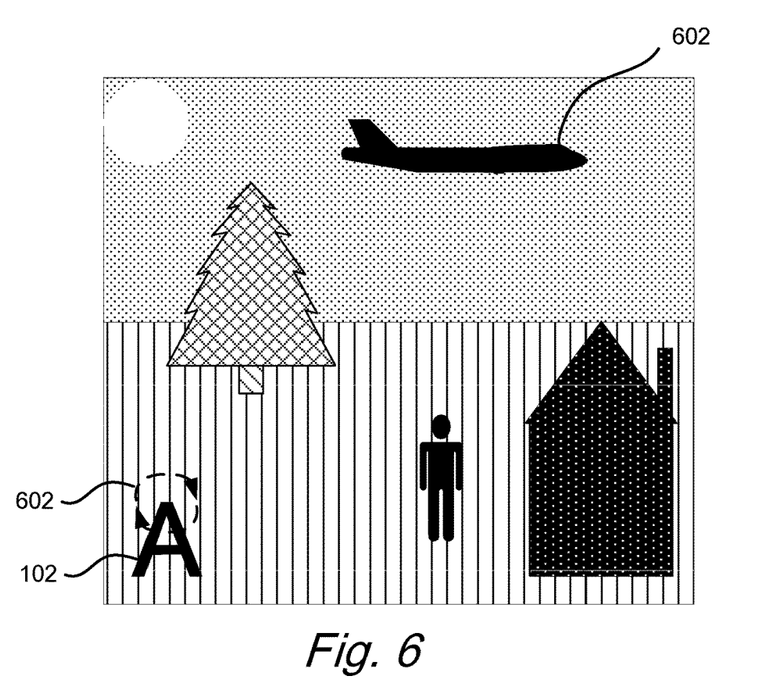
FIG. 6 shows the scene of FIG. 1 including a moving object, wherein the degree of animation of the graphical overlay is changed based on the degree of movement of the scene of the video stream, FIG. 7 describes by way of example a method for inserting a graphical overlay on a time period of a video stream, FIG. 8 schematically describes a video stream processing device, FIG. 9 schematically describes a system including the video stream processing device of FIG. 8 and a display for displaying the video stream including the graphical overlay.

FIGS. 2-5 all relate to adjustment of the position of the graphical overlay 102 and/or adjustment of the color composition of the graphical overlay. As discussed above, the graphical overlay 102 may be animated. The contribution to the final bitrate of such animated graphical overlay may be substantial. In order to reduce the final bitrate, such an animation can be stopped, or at least slowed down, i.e. a lower degree of animation may be chosen. This is an applicable way of reducing the final bitrate for all types of scenarios. However, in FIG. 6, the degree of animation 602 of the graphical overlay, represented by the arrows 602, is reduced in response to an increased degree of motion in the scene depicted by the video stream. Such an increased degree of motion in a scene typically results in an increased bitrate for encoding the video stream, and by reducing the degree of animation 602 of the graphical overlay 102, the final bitrate may be kept at or below an upper threshold bitrate. In FIG. 6, the increased degree of motion is the result of a plane 602 flying by. When a video stream processing device, for example a digital video camera acquiring a video stream depicting the scene shown in FIG. 6, detects that the scene has changed, e.g. by determining a degree of difference between a current frame (where the plane 602 is entering the scene) and a frame of a preceding time period of the video stream (when the plane has not yet entered the scene), a new degree of animation of the graphical overlay may be determined. First, the video processing device is calculating an estimated degree of motion for the video stream. Second, the degree of animation 602 of the graphical overlay 102 is adjusted (i.e. reduced) by a reduction value. The reduction value may according to embodiments be based on the estimated degree of motion which means that if the estimated degree of motion is high, the degree of animation 602 of the graphical overlay 102 is reduced more compared to if the estimated degree of motion is low.

Figure 7:
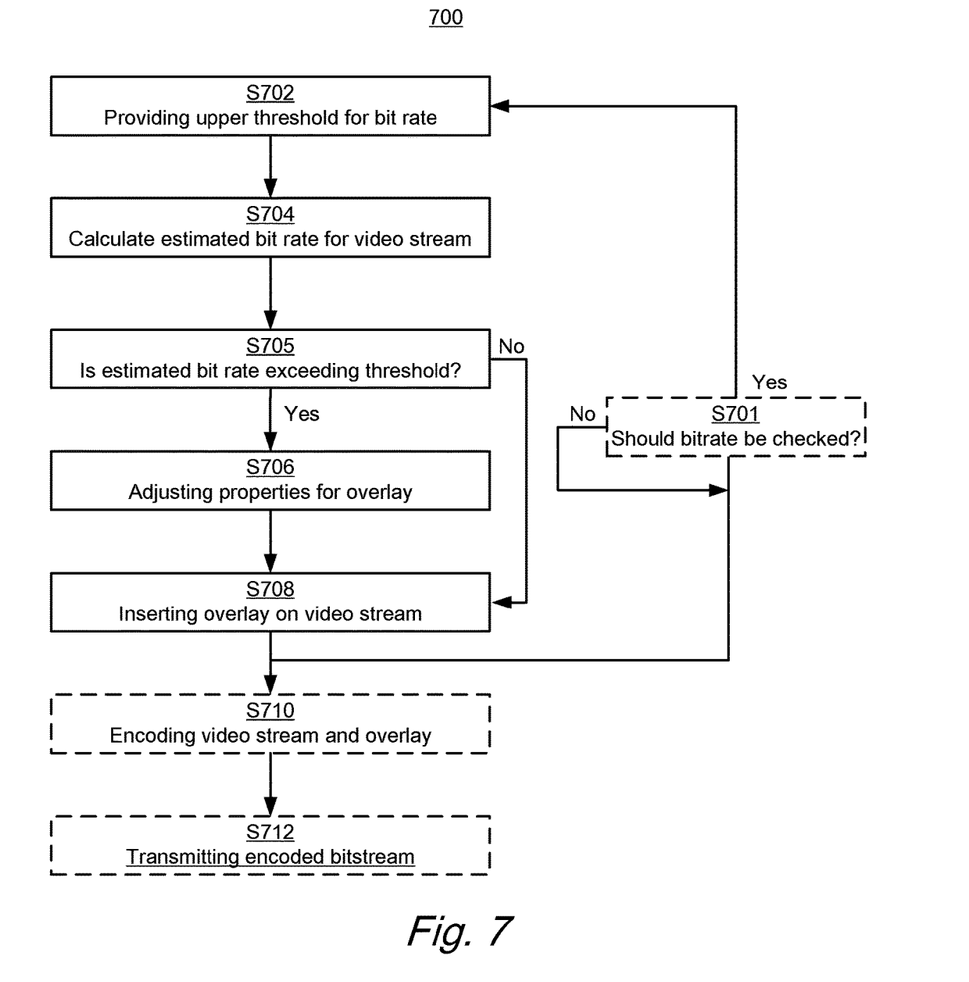

FIG. 7 describe by way of example a method 700 for inserting a graphical overlay on a video stream during a time period of the video stream. The first step in the method is the step of providing S702 an upper threshold bitrate for transmitting an encoded single bitstream comprising the time period of the video stream and the graphical overlay. The upper threshold may be a hardcoded value in a video processing device implementing the method described in FIG. 7, or it may be a value provided by a user. Additionally or alternatively, the upper threshold bitrate may depend on the speed of the connection of a digital network with which the video processing device is connected to a client for displaying the video stream, i.e. the available bitrate in such connection.

The next step is the step of calculating S704 an estimated bitrate for transmitting an encoded bitstream comprising the time period of the video stream and the graphical overlay. This calculation thus estimates what the bitrate will be if the properties of the graphical overlay are left as is. The estimation may be done using the bitrate that was required to transmit a previous time period of the video stream, e.g. the last second or the last five seconds, including the graphical overlay for the previous time period. The estimation may also be done using image statistics of frames in a previous time period of the video stream, image statistics of a previous frame in the video stream and/or image statistics of a current frame of the video stream, i.e. a start frame of the time period for which the properties of the graphical overlay is to be determined.

The next step is the step of determining S705 if the estimated bitrate exceeds the upper threshold value. Consequently it is decided if the properties of the graphical overlay need to be adjusted in order to lower the bitrate.

If an adjustment of the properties needs to be done, the next step involves adjusting S706 at least one of a position, a degree of animation and a color composition of the graphical overlay based on a scene depicted by the time period of the video stream such that a bitrate for transmitting an encoded bitstream comprising the time period of the video stream and the graphical overlay at the adjusted position, having the adjusted degree of animation and/or having the adjusted color composition falls below the upper threshold value.

No matter if the properties of the graphical overlay needed to be adjusted or not, the next step involves inserting S708 on the video stream during the time period of the video stream.

According to some embodiments, the method further comprises the steps of encoding S710 the time period of the video stream and the graphical overlay into a single encoded bitstream, and transmitting S712 the single encoded bitstream.

Also, according to some embodiments, after the graphical overlay has been inserted on the video stream, and possibly at the same time as the video stream and the graphical overlay is encoded S710 into a single encoded bitstream, the method comprises the step of determining S701 a start frame of the next time period of the video stream. This is done by checking if at least one of the following conditions has been met:

calculating a number of frames since a start frame of a preceding time period of the video stream for which an estimated bitrate for transmitting an encoded bitstream comprising the time period of the video stream and the graphical overlay was calculated and determining if the calculated number of frames is larger than a threshold value, receiving a pan, tilt and/or zoom (PTZ) signal from a PTZ video camera acquiring the video stream, determining a degree of difference between a current frame and a frame of a preceding time period of the video stream for which an estimated bitrate for transmitting an encoded bitstream comprising the time period of the video stream and the graphical overlay was calculated by performing a block-matching operation between the current frame and the frame of the preceding time period, and determining if the degree of difference is larger than a threshold value.

E.g. if a certain number of frames in the video stream have passed since it was determined S705 if the estimated bitrate exceeds the upper threshold value, and/or if a PTZ signal has been received, and/or if the content of the frames in the video stream has changed to a certain extent, the steps S702, S704 and S705 are performed again to see if any adjustment S706 of the properties of the graphical overlay may be needed.

Figure 8:
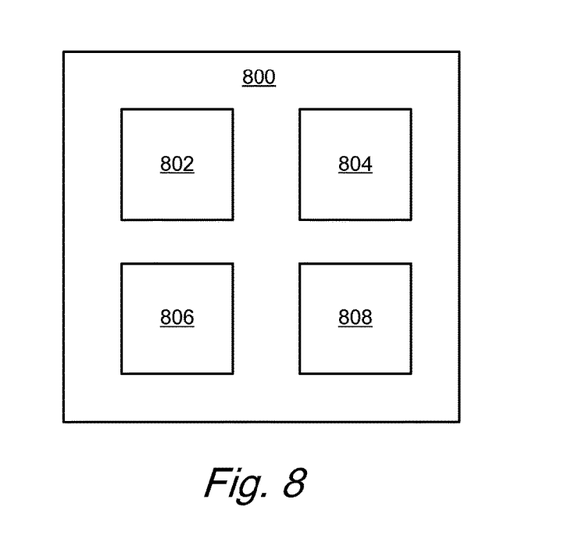

FIG. 8 describes a video stream processing device 800 according to embodiments. The device 800 comprises a memory 802 which is configured to store an upper threshold bitrate for transmitting an encoded single bitstream comprising a time period of a video stream and a graphical overlay. The device 800 further comprises a bitrate estimating module 804 configured to calculate an estimated bitrate for transmitting an encoded bitstream comprising the time period of the video stream and the graphical overlay. The device 800 also comprises a graphical overlay handling module 806 configured to determine if the estimated bitrate exceeds the upper threshold value, and if the estimated bitrate exceeds the upper threshold value, to adjust at least one of a position, a degree of animation and a color composition of the graphical overlay based on a scene depicted by the time period of the video stream such that a bitrate for transmitting an encoded bitstream comprising the time period of the video stream and the graphical overlay at the adjusted position, having the adjusted degree of animation and/or having the adjusted color composition falls below the upper threshold value. The device 800 also comprises a graphical overlay inserting module 808 configured to insert the graphical overlay on the video stream during the time period of the video stream. The bitrate estimating module 804, the graphical overlay handling module 806 and the graphical overlay inserting module 808 may be implemented in software and executed by at least one processor in the video stream processing device 800, for example by a central processing unit (CPU) and/or a graphical processing unit (GPU) of the video stream processing device 800.

Figure 9:
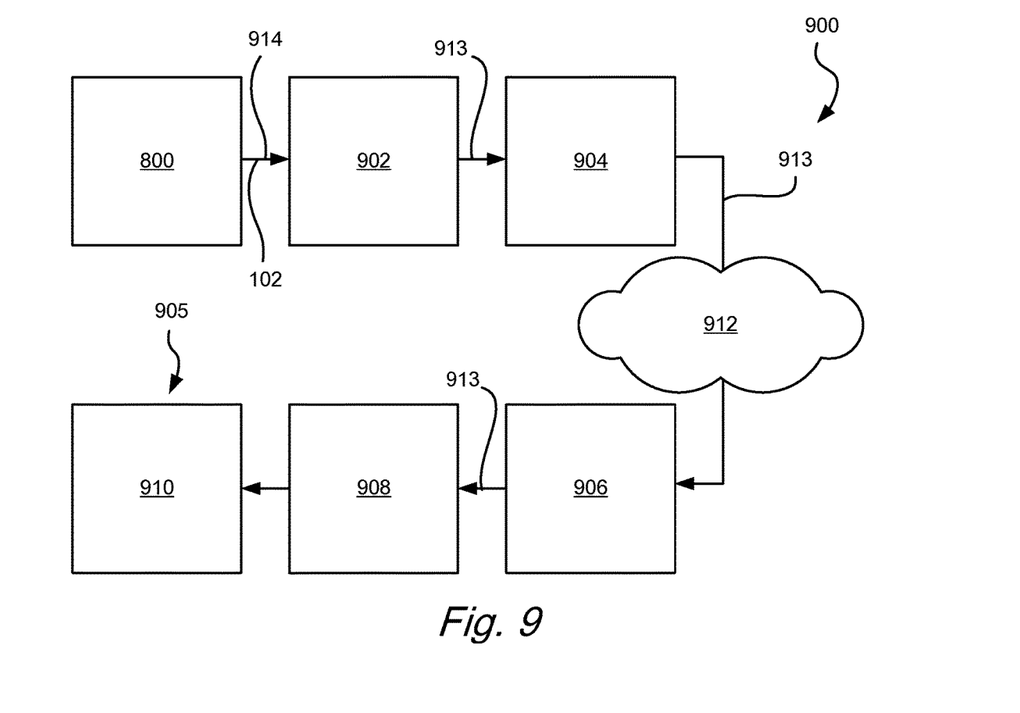

FIG. 9 describes a video system 900 comprising the video stream processing device 800 described in FIG. 8. The time period of the video stream 914 and the graphical overlay 102 is transmitted from the video processing device 800 to an encoder 902 configured to encode the time period of the video stream 914 and the graphical overlay 102 into a single encoded bitstream 913. The encoder may be implemented in software and executed by a processor. It should be noted that the encoder may be part of the video stream processing device 800 or implemented in a separate device. The single encoded bitstream 913 is then transmitted to a first digital network module 904 configured to transmit the single encoded bitstream 913 via digital network 912. The digital network module 904 may be part of the video stream processing device 800 or the encoder 902 or implemented in a separate device.

The single encoded bitstream 913 is received by a second digital network module 906 via the digital network 912. A decoder 908 is configured to decode the single encoded bitstream into a time period of a video stream comprising the graphical overlay. The system further comprises a client 905 which comprises a display 910 configured to display the time period of the video stream comprising the graphical overlay. According to embodiments, the client 905 comprises the digital network module 906 and the decoder 908.

Figure 10:
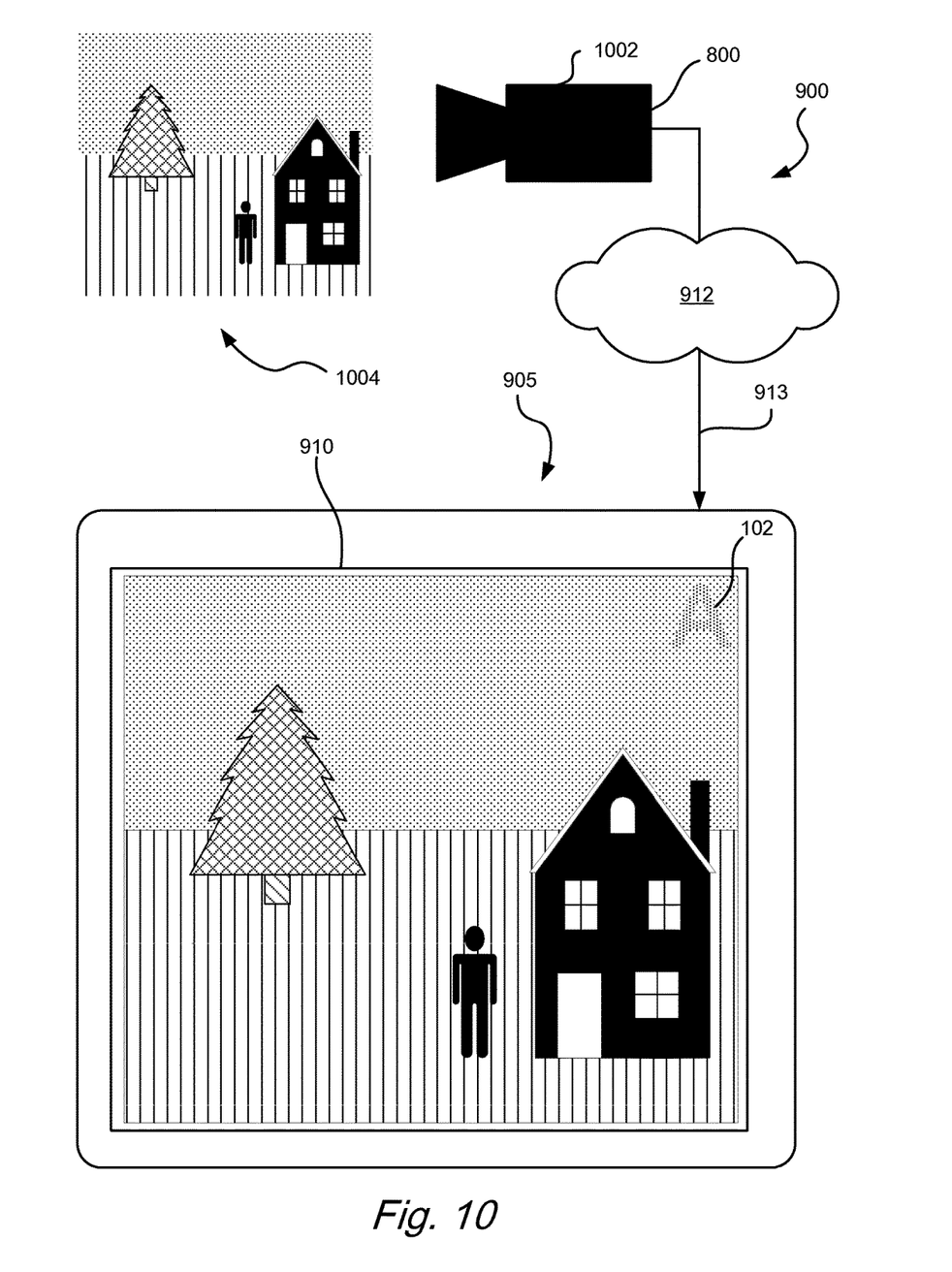
FIG. 10 shows the system of FIG. 9 in action.

FIG. 10 describe the system 900 in action. The video processing device 800, and the digital network module (not shown) and the encoder (not shown), are parts of a digital video camera 1002 which acquires a video stream of a scene 1004. The single encoded bitstream 913 is transmitted, via the digital network module and the digital network 912, to a client 905. The client comprises a display 910 and further a decoder (not shown) and a digital network module (not shown). The displayed video stream comprises a graphical overlay 102 which in this particular example has been placed in the top right corner on an area which has a low contrast value. Moreover, the color composition of the graphical overlay 102 has been adjusted to be similar to the color composition of the area on which it has been placed.

In summary, the disclosed embodiments generally relate to a video communication systems, and more specifically to a method and device for adjusting properties of a graphical overlay for a video stream, the adjusted properties being at least one of a position, a degree of animation and a color composition of the graphical overlay and the adjustment is based on a scene depicted by the time period of the video stream. The adjustment is performed if an estimated bitrate for transmitting an encoded bitstream comprising the time period of the video stream and the graphical overlay exceeds a predetermined upper threshold bitrate for transmitting an encoded single bitstream comprising the time period of the video stream and the graphical overlay.

What is claimed is:

1. A method for inserting a graphical overlay on a video stream during a time period of the video stream, comprising:
providing an upper threshold bitrate for transmitting an encoded single bitstream comprising the video stream during the time period of the video stream and the graphical overlay;
calculating an estimated bitrate for transmitting an encoded bitstream comprising the video stream during the time period of the video stream and the graphical overlay; and
determining if the estimated bitrate exceeds the upper threshold bitrate, and in response to the estimated bitrate exceeding the upper threshold bitrate:
adjusting a degree of animation of the graphical overlay the adjustment being based on a relationship between visual features of the graphical overlay and visual features of a scene depicted by the video stream during the time period of the video stream such that a bitrate for transmitting an encoded bitstream comprising the video stream during the time period of the video stream and the graphical overlay having the adjusted degree of animation falls below the upper threshold bitrate, wherein the adjusting comprises estimating a degree of motion for the video stream during the time period of the video stream and adjusting the degree of animation of the graphical overlay for the video stream during the time period of the video stream by reducing the degree of animation by a value based on the estimated degree of motion; and
inserting the graphical overlay on the video stream during the time period of the video stream.

2. The method of claim 1, further comprising:
determining a start frame of the video stream during time period of the video stream by at least one of:
calculating a number of frames since a start frame of a the video stream during a preceding time period of the video stream for which an estimated bitrate for transmitting an encoded bitstream comprising the video stream during the time period of the video stream and the graphical overlay was calculated and determining if the calculated number of frames is larger than a threshold value;
receiving a pan, tilt and/or zoom signal from a PTZ video camera acquiring the video stream; and
determining a degree of difference between a current frame and a frame of the video stream during a preceding time period of the video stream for which an estimated bitrate for transmitting an encoded bitstream comprising the time period of the video stream and the graphical overlay was calculated by performing a block-matching operation between the current frame and the frame of the video stream during the preceding time period, and determining if the degree of difference is larger than a threshold value.

3. The method of claim 1, further comprising:
encoding the video stream during the time period of the video stream using one or more group of pictures, GOP, structures, each GOP structure comprising an intra frame followed by a plurality of inter frames, wherein a start frame of the video stream during the time period of the video stream coincides with the intra frame of a first GOP structure out of the one or more GOP structures.

4. The method of claim 1, wherein the calculating an estimated bitrate is performed using at least one of:
a required bitrate for transmitting an encoded bitstream comprising the video stream during a preceding time period of the video stream;
a subset of data of the video stream during the time period of the video stream; and
a subset of data of the video stream during a preceding time period of the video stream.

5. The method of claim 1, wherein the adjusting comprises:
adjusting a spatial position of the graphical overlay, wherein the adjusted spatial position for the graphical overlay is one of a plurality of predetermined spatial positions.

6. The method of claim 5, wherein the adjusting the spatial position of the graphical overlay is associated with receiving a pan, tilt and/or zoom signal from a PTZ video camera acquiring the video stream.

7. The method of claim 1, wherein the adjusting comprises:
determining a contrast value for each of a plurality of areas in the scene depicted by the video stream during the time period of the video stream,
adjusting the spatial position of the graphical overlay based on the determined contrast values.

8. The method of claim 7, wherein if the contrast value corresponding to the determined spatial position of the graphical overlay is below a threshold value, the adjusting further comprises:

determining a color composition of the area corresponding to the determined spatial position of the graphical overlay; and
adjusting the color composition of the graphical overlay based on the determined color composition of the area such that a contrast value between the graphical overlay and the area is reduced.

9. The method of claim 1, wherein the adjusting further comprises:
determining a color composition for each of a plurality of areas in the scene depicted by the video stream during the time period of the video stream; and
adjusting a spatial position of the graphical overlay by comparing the determined color compositions and a color composition of the graphical overlay.

10. The method of claim 1, wherein the adjusting further comprises:
determining a color composition of an area corresponding to a present spatial position of the graphical overlay; and
adjusting the color composition of the graphical overlay based on the determined color composition such that a contrast value between the graphical overlay and the area is reduced.

11. An article of manufacture including a computer-readable non-transitory storage medium having instructions stored thereon, execution of which by a computing device causes the computing device to perform operations comprising:
providing an upper threshold bitrate for transmitting an encoded single bitstream comprising the video stream during the time period of the video stream and the graphical overlay;
calculating an estimated bitrate for transmitting an encoded bitstream comprising the video stream during the time period of the video stream and the graphical overlay; and
determining if the estimated bitrate exceeds the upper threshold bitrate-, and in response to the estimated bitrate exceeding the upper threshold bitrate:
adjusting a degree of animation of the graphical overlay, the adjustment being based on a relationship between visual features of the graphical overlay and visual features of a scene depicted by the video stream during the time period of the video stream such that a bitrate for transmitting an encoded bitstream comprising the video stream during the time period of the video stream and the graphical overlay having the adjusted degree of animation falls below the upper threshold bitrate, wherein the adjusting comprises estimating a degree of motion for the video stream during the time period of the video stream and adjusting the degree of animation of the graphical overlay for the video stream during the time period of the video stream by reducing the degree of animation by a value based on the estimated degree of motion; and
inserting the graphical overlay on the video stream during the time period of the video stream.

12. A video stream processing device comprising:
a memory configured to store an upper threshold bitrate for transmitting an encoded single bitstream comprising a video stream during a time period of a video stream and a graphical overlay; and
a processor, wherein the processor is configured to:
calculate an estimated bitrate for transmitting an encoded bitstream comprising the video stream during the time period of the video stream and the graphical overlay;
determine if the estimated bitrate exceeds the upper threshold bitrate, and in response to the estimated bitrate exceeding the upper threshold bitrate, adjust a degree of animation of the graphical overlay, the adjustment being based on a relationship between visual features of the graphical overlay and to visual features of a scene depicted by the video stream during the time period of the video stream such that a bitrate for transmitting an encoded bitstream comprising the video stream during the time period of the video stream and the graphical overlay having the adjusted degree of animation falls below the upper threshold bitrate, wherein the adjusting comprises estimating a degree of motion for the video stream during the time period of the video stream and adjusting the degree of animation of the graphical overlay for the video stream during the time period of the video stream by reducing the degree of animation by a value based on the estimated degree of motion; and
insert the graphical overlay on the video stream during the time period of the video stream.

13. The video stream processing device of claim 12, being a digital video camera, wherein the video stream during the time period of the video stream is acquired by the digital video camera.

14. A system comprising:
a video stream processing device comprising:
a memory configured to store an upper threshold bitrate for transmitting an encoded single bitstream comprising a video stream during a time period of a video stream and a graphical overlay; and
a processor, wherein the processor is configured to:
calculate an estimated bitrate for transmitting an encoded bitstream comprising the video stream during the time period of the video stream and the graphical overlay; and
determine if the estimated bitrate exceeds the upper threshold bitrate, and, in response to the estimated bitrate exceeding the upper threshold bitrate, adjust a degree of animation of the graphical overlay by reducing a degree of animation of the graphical overlay by a value, the adjustment being based on a relationship between visual features of the graphical overlay and visual features of a scene depicted by the video stream during the time period of the video stream such that a bitrate for transmitting an encoded bitstream comprising the video stream during the time period of the video stream and the graphical overlay having the adjusted degree of animation falls below the upper threshold bitrate, wherein the adjusting comprises estimating a degree of motion for the video stream during the time period of the video stream and adjusting the degree of animation of the graphical overlay for the video stream during the time period of the video stream by reducing the degree of animation by a value based on the estimated degree of motion.

* * * * *